Nov. 22, 1966   J. SHUSTER ETAL   3,286,815
SPACING DEVICE
Filed Dec. 16, 1964
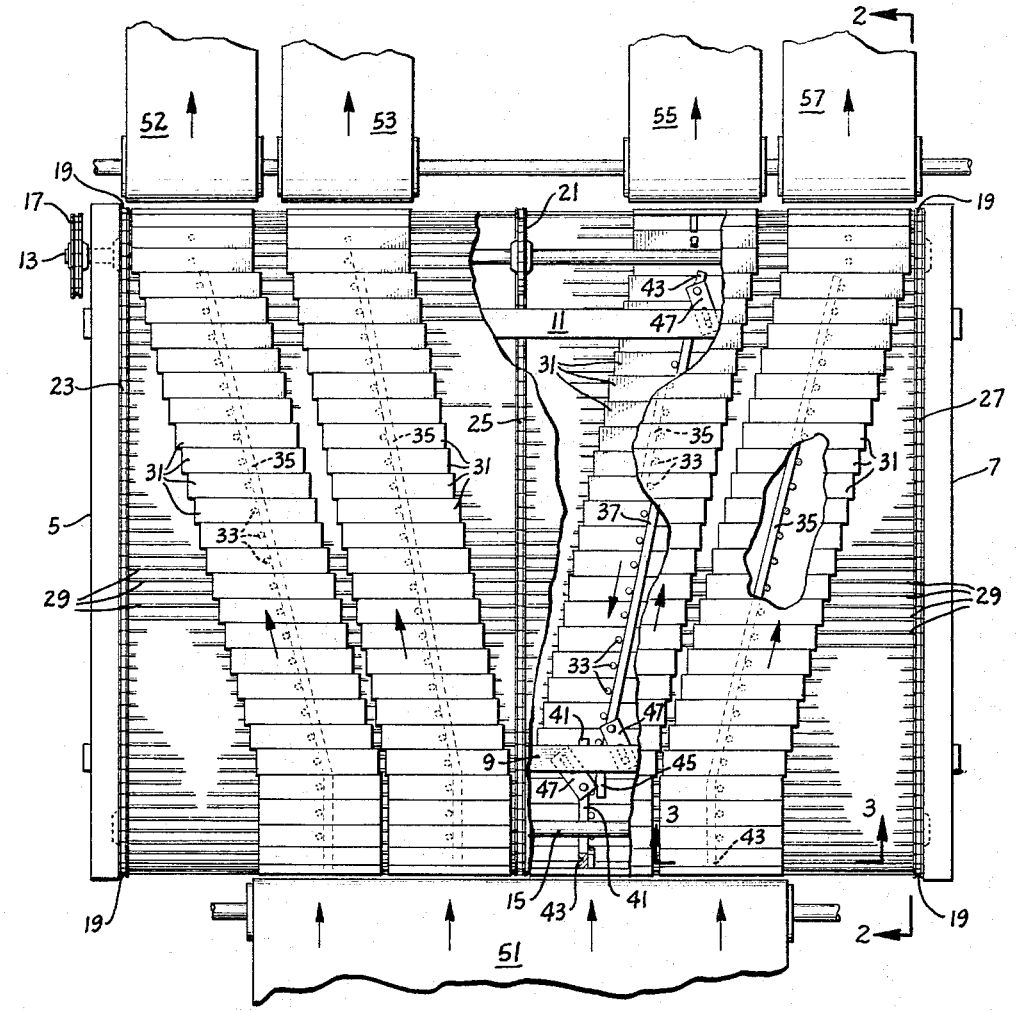
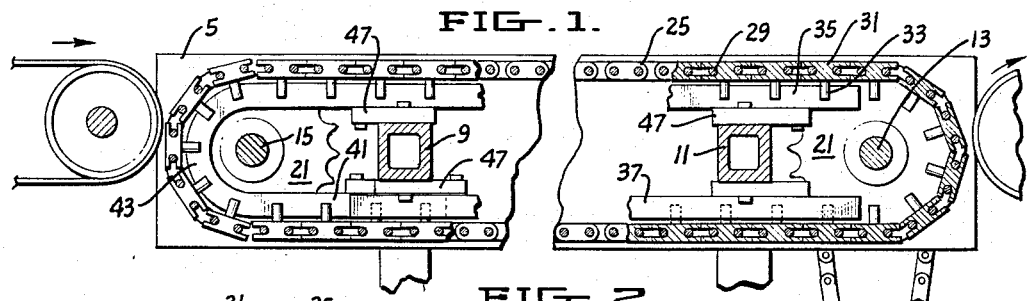
FIG._1.
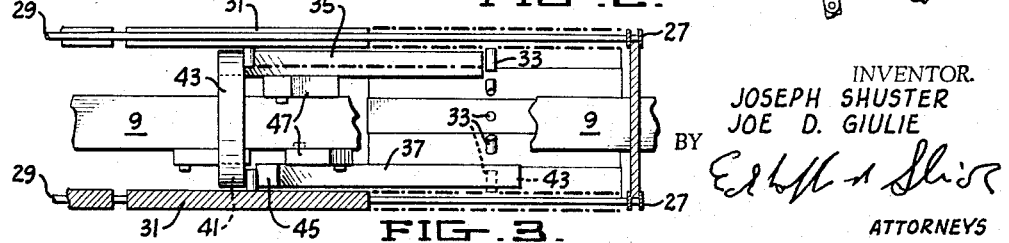
FIG._2.
FIG._3.
INVENTOR.
JOSEPH SHUSTER
JOE D. GIULIE
BY
ATTORNEYS

United States Patent Office 3,286,815
Patented Nov. 22, 1966

3,286,815
SPACING DEVICE
Joseph Shuster, Saratoga, and Joe D. Giulie, Los Altos Hills, Calif., assignors to Illumitronic Systems Corporation, a corporation of California
Filed Dec. 16, 1964, Ser. No. 418,737
3 Claims. (Cl. 198—34)

This invention relates to a conveyor system, and more particularly relates to a conveyor system wherein closely spaced articles which are moving on a conveyor in side by side relationship can be spread apart or vice versa.

In conveying systems, wherein a plurality of articles are carried along a path side by side in relationship, it is frequently desirable to alter the lateral spacing of the articles. For instance, pies may come out of an oven in closely spaced, side by side relationship, and it may be desirable to space the pies while they are cooling. Since the pies have delicate crusts extending to the very edges of the pans in which the pies are baked, it is obvious that they must be handled very gently and cannot be subject to any jarring or the application of pressure applied to the piepan. In other applications, it may be desirable to change the side by side spacing of articles when they pass from a filler to a labeler, or when going from one filling operation to another.

Although the invention will be described in terms of separating articles which are in close spaced relationship, it will be obvious that the device can be operated in either direction so that if it is desired to close the lateral spacing on widely spaced articles, this can be readily accomplished.

It is an object of the present invention to provide a conveyor system wherein the lateral spacing of articles moving over the conveyor system can be changed.

Another object of this invention is to provide a conveyor system for changing the lateral spacing of articles, which is very gentle in its operation, so that the articles moving over the conveyor will not be subjected to any jarring motions.

Another object of this invention is to provide a conveyor for changing the lateral spacing of articles wherein the articles are conveyed on a substantially continuous, smooth conveyor.

Other objects of this invention will be apparent from the balance of the specification which follows.

In the drawings forming part of this application:

FIGURE 1 is a plan view of a device embodying our invention, with certain parts cut away, to illustrate the principle of operation.

FIGURE 2 is a side view, partly in section, on the line 2—2 of FIGURE 1.

FIGURE 3 is a partial end view on the line 3—3 of FIGURE 1.

Turning now to a description of the drawings by reference characters, the device comprises side frame members 5 and 7, which are held in spaced relationship by cross frame members 9 and 11. The side frame members support a driving shaft 13 and a driven shaft 15 which are located near the opposite ends of the frame members 5 and 7. Shaft 13 has a driving sprocket 17 thereon, so that the shaft can be driven from a source of power, not shown. The shafts 13 and 15 each have end sprockets 19 and center sprockets 21 thereon, forming pairs of sprockets around which the endless chains 23, 25 and 27 are trained. The three chains are conventional roller chains, but instead of the usual pins, rods 29 are provided running between corresponding links on the three chains, said rods extending across the width of the conveyor. Mounted on adjacent pairs of the rods 29 are the carrier plaques 31. These plaques extend over the rods 29 in each direction, as is best seen in FIGURE 2, so that the plaques form a substantially continuous path on the horizontal runs of the chains. These plaques are preferably made of a tough plastic and each plaque has a downwardly extending pin 33 which is preferably located at the center of the plaque. The plaques have a sliding fit on the rods, so that they can easily be moved from side to side.

In order to divert the carrier plaques, an upper guide rail 35 is provided for each row of plaques while a lower guide rail 37 is similarly provided for each row of plaques, in order to bring the plaques back to their center position. The upper guide rail 35 starts below the row of carriers at 41, has a guide loop 43 extending upwardly at the front side of the machine, and then extends to the side as is shown in the cutout portion at the right hand side of FIGURE 1. The lower carrier return guide rail 37 starts near the rear of the machine as at 43, extends toward the center of the machine as is shown in the center cutout of FIGURE 1, and has a short section 45, extending parallel to the run of the conveyor. It will also be noted that there is a short overlap between the forward extremities of the upper and lower guide rails. The upper and lower guide rails are held to the frame members 9 and 11 by a plurality of adjustable clips 47, so that adjustment can easily be made for the precise paths desired of the various carrier plaques.

In operation, at the start of the run, all of the plaques are located in parallel rows near the center of the machine, as is shown in the lower portion of FIGURE 1. As the rods advance, carrying the plaques, the depending pins 33 on the plaques contact the upper guide rail 35, causing the plaques to be gently urged toward the sides of the machine, as is shown. Thus, articles which are carried on the broad conveyor belt 51 will be distributed on the various plaques and will then be carried outwardly where they will be received by various off-belts, such as those designated 52, 53, 55 and 57. As the plaques are carried around the discharge end of the machine, they pass underneath the machine, whereupon the pins 33 will engage one of the lower rails 37 and will then be returned to the center starting position. Since the upper guide rail 35 extends through the loop 43 to the bottom of the machine at 41, there will be no tendency for inertia to carry the plaques beyond the desired center position.

It will be obvious to those skilled in the art that many variations can be made on the device of the present invention without departing from the spirit of this invention. Thus, four rows of plaques have been illustrated, but it is obvious that less than four paths might be provided, or that a greater number than four could be provided. Further, the machine has been shown in operation wherein the articles are diverted, but it is quite obvious that the machine could be operated in the opposite direction so that the articles are converged.

We claim:

1. A device for changing the lateral spacing of a plurality of articles on a conveyor, comprising in combination:

(a) a conveyor belt of a certain width for conveying and delivering articles in one direction from a delivery end;

(b) an endless conveyor having a forward side and a rearward side, and having an upper horizontal run moving forwardly in said one direction and having a lower reversely moving horizontal run;

(c) means for driving said endless conveyor in said one direction;

(d) a plurality of elongate carrier plaques mounted on said endless conveyor to be carried forwardly thereby from said conveyor belt and movable laterally thereon perpendicular to said one direction of movement, each of said plaques having a top side and an underside and having a member projecting from the said underside thereof;

(e) said plurality of carrier plaques assembled to define a plurality of paths over the endless conveyor, each path having an article receiving end positioned to receive articles on the plaques directly from said delivery end of said conveyor belt and having an article discharge end;

(f) said carrier plaques in each of said paths being in longitudinal edge engaging relation with the said top sides thereof together forming an unbroken article supporting surface through the length of the path;

(g) said article receiving ends of said paths being in relatively close side by side relation and positioned approximately centrally of the endless conveyor and said conveyor belt width being at least equal to the combined widths of said receiving ends of the paths for delivering articles from the belt directly onto the plaques;

(h) a plurality of individual article receiving conveyor belts equal in number to said paths disposed at said forward side of said endless conveyor in a position for each to receive articles directly thereon from the plaques of the adjacent paths;

(i) said individual article receiving conveyor belts each being of a width less than the first said conveyor belt but at least substantially equal to the widths of the paths formed by the plaques;

(j) said plurality of individual article receiving conveyor belts being in spaced relation with one another and offset laterally of the direction of movement of said endless plaque carrying conveyor with respect to the article receiving ends of the adjacent paths of plaques;

(k) first guide cam rail means located under the upper run of said endless conveyor and adapted to be engaged by the depending members on said carrier plaques to urge said plaques into lateral diversion paths and effecting the said lateral offsetting of the plaques of the paths;

(l) and second guide cam rail means located above the lower run of said endless conveyor and adapted to be engaged by said members and to return said carrier plaques to a central position;

(m) said first and second guide cam rail means associated with each of said paths of plaques functioning to restrict or maintain the plaques to movement continuously in a fixed path so that the plaques of one path cannot cross over to an adjacent path.

2. The invention according to claim 1, wherein;

(n) said first guide cam rail means has a short obtusely angled portion extending rearwardly at said receiving ends of said carrier plaque paths and continuing rearwardly, downwardly and forwardly forming a carrier guide loop, said guide loop continuing in a relatively long terminal portion directed forwardly and located above the said lower run of said conveyor;

(o) and said second guide cam rail means has a short obtusely angled terminal portion extending rearwardly in spaced parallel overlapping relationship with said continuing terminal portion of said guide loop.

3. The invention according to claim 2, with;

(p) position holding means for said guide cam rail means adapted for adjusting said rails to the precise paths of travel desired for the various plaques.

References Cited by the Examiner

UNITED STATES PATENTS

| 2,488,230 | 11/1949 | Page | 198—30 |
| 3,129,803 | 4/1964 | Giulie et al. | 198—31 |
| 3,190,432 | 6/1965 | Vanderhoof | 198—31 |

EVON C. BLUNK, *Primary Examiner.*

R. J. HICKEY, *Assistant Examiner.*